UNITED STATES PATENT OFFICE.

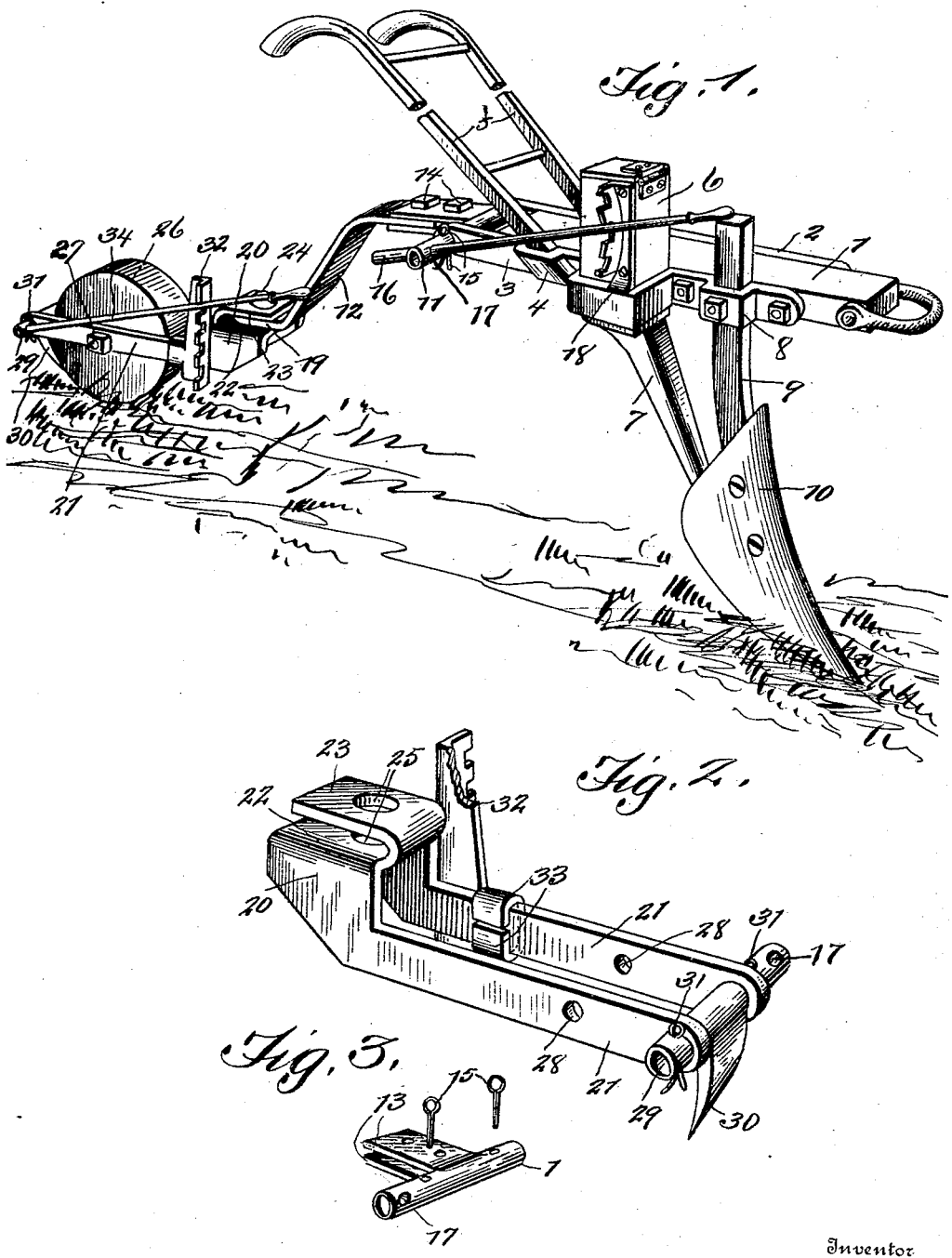

JOSEPHUS BINGAMAN, OF GARNETT, KANSAS.

PLOW ATTACHMENT.

No. 875,407.     Specification of Letters Patent.     Patented Dec. 31, 1907.

Application filed August 27, 1907. Serial No. 390,284.

*To all whom it may concern:*

Be it known that I, JOSEPHUS BINGAMAN, a citizen of the United States, residing at Garnett, in the county of Anderson and State of Kansas, have invented certain new and useful Improvements in Plow Attachments, of which the following is a specification.

My invention pertains to improvements in plow attachments, and relates more particularly to an attachment which embodies a covering wheel designed especially for the planting of corn to cover the grain with the earth or soil which the plow has displaced in making the furrow.

The invention aims to provide a device of this type of increased efficiency and utility, and one of a simple practical nature.

With the above and other objects in view my invention further consists of the novel details of construction, combination and arrangement of parts the details of which will appear in the course of the following specification in which reference is had to the accompanying drawings forming a part of this specification, like characters of reference designating similar parts throughout the several views wherein, Figure 1, is a perspective view of the invention applied to a plow, and, Figs. 2 and 3, are detail perspective views.

1, designates the plow beam which on one side has a bracket member 2, secured thereto which projects beyond the rear end of the beam, and on its opposite side has a bracket member 3, secured thereto. These bracket members are formed with suitable sockets as at 4, to receive the plow handles 5, and bracket 3, is in addition formed to receive and support a suitable corn dropping appliance designated 6, and is further formed with a plow point support or standard 7, and the socket 8, to receive a second plow point support or standard 9, the plow point being designated 10. The projecting ends of brackets 2 and 3, are formed with apertures through which are passed the pivot bar 11, carried by the angular spring bar 12. This bar 12, is possessed of a suitable degree of resiliency and is shown as being of the flat type. Pivot bar 11, is preferably hollow being of tubular form and is provided with two rearwardly extending ears 13, in spaced relation so as to firmly embrace the front end of spring bar 12, to which latter the ears are rigidly secured by means of bolts 14. By virtue of the aforesaid rigid connection between the pivot bar and the spring bar it will be manifest that any movement of the pivot bar in an arc like plane will be correspondingly communicated to the spring bar 12. Lateral movement of the pivot bar is prevented by virtue of the cotter pins 15, which are passed through apertures provided therefor in the pivot bar 11, as depicted in Fig. 1.

Spring bar 12, may be adjusted and retained in its adjusted position by means of the rod 16, which is passed through a suitable aperture 17, provided in a projecting end of the pivot bar 11. Bracket 3, is formed with a segmental rack 18, which engages rod 16, and sustains the same against vertical movement. In addition the rack member serves as a means to support the corn dropping appliance, as illustrated in Fig. 1.

The lower end of spring bar 12, is continued rearwardly in a horizontal plane as at 19, in which respect it corresponds to the disposition of the upper end of the spring bar 12, though in an opposite direction from the latter. 20, designates a carrying frame for the covering-wheel which is preferably of the construction shown in Fig. 2, wherein the the same is illustrated as embodying two spaced longitudinal side members 21, connected at their forward ends by means of an integral horizontal part 22, the latter being extended to form an overlying lip 23. Between part 22, and lip 23, end 19, of the spring bar 12, is freely embraced. A pivot member 24, is projected through suitable apertures 25, in part 22, and lip 23, and through end 19, of spring bar 12. It will thereby be observed that the frame 20, is capable of movement in a horizontal arc like plane.

The covering wheel 26, is arbitrarily shown as of the flat peripheral type though other forms may be substituted at will, the same being supported by axle 27, which is projected through apertures 28, in the sides 21. A tubular bar 29, which carries the scraper 30, is also projected through the sides 21, being secured against lateral movement by means of cotter pins 31. This scraper acts against wheel 26, and in conditions of excessively wet or muddy soil serves to free the wheel of any earth which may adhere to the same. A vertical rack 32, is formed at its lower end with an extension formed with bendable lips 33, which embrace one of the sides 21, of frame 20, which thereby stationarily support the rack. A rod 34, is passed through one of the projecting ends of the tubular bar 29, of scraper 30, and engages between the teeth of rack 32, whereby the scraper may be brought into intimate contact or freed from engagement with wheel 26.

In operation it will be observed that the furrows made by plow point 10, receive the grain periodically dropped from the dropper 6, and wheel 26, which is to the rear of the dropper causes the soil displaced by the plow point to be forced back into the furrow and thereby cover the corn. By adjusting the spring bar 12, by virtue of rod 16, wheel 26, may be brought with the desired pressure upon the displaced earth.

Having thus fully described my invention, what I claim is:—

1. In combination with a plow beam, an angular spring bar having its central portion diagonally disposed with respect to the plow beam and having its upper end movably connected to the latter, means to enable adjustment of the position of the lower end of said bar, a frame pivotally connected to said bar, and a wheel carried by said frame.

2. In combination with a plow beam, a spring bar having a diagonal central portion and horizontally disposed ends, a pivot bar rigidly connected to the upper end of said spring bar, a rod rigidly connected to said pivot bar, a toothed rack carried by the plow beam to engage said rod and sustain the spring bar in adjusted position, a wheel carrying frame composed of longitudinal side members, a horizontal connecting part for said side members, a lip connected to said horizontal part and overlying the same, the lower end of said spring bar being received between said horizontal part and said lip and being pivoted to the same, and a wheel mounted between said side members.

3. In combination with a plow beam, a spring bar diagonally disposed with relation to the beam thereof and pivotally connected to the latter, means to enable adjustment of the free end of said bar in an arc-like plane, a wheel carrying frame composed of spaced side members, a horizontal connecting member and a lip overlying said horizontal connecting member, the lower end of said spring bar being pivoted to said frame and being received in the space between said horizontal connecting member and said lip, and a wheel carried by said frame between the side members thereof.

4. In combination with a plow beam, a spring bar connected thereto, a wheel carrying frame pivoted to said bar, a wheel carried by said frame, a rack secured to the frame, a scraper journaled in the outer end of the frame, and a rod rigidly connected to said scraper and adapted to engage said rack.

5. In combination with a plow beam, a pivot bar rigidly connected to the upper end of said bar, a rod rigidly connected to said pivot bar, a rack carried by the plow beam to engage said rod, a wheel carrying frame pivoted to the lower end of said spring bar, and a wheel journaled in said frame.

6. In combination with a plow beam, a spring bar pivoted thereto, a wheel carrying frame consisting of side members, pivoted to the lower end of said spring bar, a bar projected through the rear ends of said side members, a scraper carried by said bar, a rod rigidly connected to said scraper bar, and a rack to engage said rod, said rack embodying a vertical member and lips which are bent into engagement with one of the side members of said frame.

In testimony whereof I affix my signature, in presence of two witnesses.

JOSEPHUS BINGAMAN.

Witnesses:
EBERT SIMON,
FOEL BLUM.